United States Patent
Henry

(10) Patent No.: US 9,887,734 B2
(45) Date of Patent: *Feb. 6, 2018

(54) OUTBOUND INTERFERENCE REDUCTION IN A BROADBAND POWERLINE SYSTEM

(71) Applicant: AT&T Intellectual Property II, L.P., Atlanta, GA (US)

(72) Inventor: Paul Shala Henry, Holmdel, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/401,629

(22) Filed: Jan. 9, 2017

(65) Prior Publication Data

US 2017/0117935 A1 Apr. 27, 2017

Related U.S. Application Data

(63) Continuation of application No. 14/551,582, filed on Nov. 24, 2014, now Pat. No. 9,577,706, which is a continuation of application No. 10/839,945, filed on May 6, 2004, now Pat. No. 8,938,021.

(51) Int. Cl.
*H04B 3/30* (2006.01)
*H04L 5/00* (2006.01)
*H04B 3/54* (2006.01)

(52) U.S. Cl.
CPC .............. *H04B 3/30* (2013.01); *H04B 3/54* (2013.01); *H04L 5/0005* (2013.01)

(58) Field of Classification Search
CPC ............ H04B 3/30; H04B 3/54; H04L 5/0005
See application file for complete search history.

(56) References Cited

U.S. PATENT DOCUMENTS

| | | | |
|---|---|---|---|
| 4,386,357 A | 5/1983 | Patton | |
| 4,602,240 A | 7/1986 | Perkins et al. | |
| 4,644,355 A | 2/1987 | Russell | |
| 5,684,450 A | 11/1997 | Brown | |
| 5,835,005 A * | 11/1998 | Furukawa | ............... H04B 3/58 340/12.32 |
| 5,847,447 A | 12/1998 | Rozin et al. | |
| 5,864,284 A | 1/1999 | Sanderson | |

(Continued)

OTHER PUBLICATIONS

"Broadband Powerline Communications Systems a Background Brief," Australian Communications Authority, Document SP 11/03, Sep. 2003, 23 pages, Australia.

*Primary Examiner* — Brian D Nguyen
(74) *Attorney, Agent, or Firm* — Chiesa Shahinian & Giantomasi PC

(57) ABSTRACT

Disclosed is a method and apparatus for reducing outbound interference in a broadband powerline communication system. Data is modulated on first and second carrier frequencies and is transmitted via respective first and second lines of the powerline system. A characteristic of at least one of the carrier signals (e.g., phase or amplitude) is adjusted in order to improve the electrical balance of the lines of the transmission system. This improvement in electrical balance reduces the radiated interference of the powerline system. Also disclosed is the use of a line balancing element on or more lines of the powerline system for altering the characteristics of at least one of the power lines in order to compensate for a known imbalance of the transmission system.

20 Claims, 2 Drawing Sheets

(56) References Cited

U.S. PATENT DOCUMENTS

| | | |
|---|---|---|
| 5,929,750 A | 7/1999 | Brown |
| 5,933,071 A | 8/1999 | Brown |
| 5,949,327 A | 9/1999 | Brown |
| 5,952,914 A | 9/1999 | Wynn |
| 5,982,276 A | 11/1999 | Stewart |
| 6,040,759 A | 3/2000 | Sanderson |
| 6,137,412 A | 10/2000 | Herzer |
| 6,141,634 A | 10/2000 | Flint et al. |
| 6,144,292 A | 11/2000 | Brown |
| 6,157,292 A | 12/2000 | Piercy et al. |
| 6,172,597 B1 | 1/2001 | Brown |
| 6,173,021 B1 | 1/2001 | Bingel et al. |
| 6,282,405 B1 | 8/2001 | Brown |
| 6,288,631 B1 * | 9/2001 | Shinozaki ............... H04B 3/542 340/12.33 |
| 6,297,729 B1 | 10/2001 | Abali et al. |
| 6,297,730 B1 | 10/2001 | Dickinson |
| 6,313,738 B1 | 11/2001 | Wynn |
| 6,317,031 B1 | 11/2001 | Rickard |
| 6,331,814 B1 | 12/2001 | Albano et al. |
| 6,396,392 B1 | 5/2002 | Abraham |
| 6,396,393 B2 | 5/2002 | Yuasa |
| 6,404,773 B1 | 6/2002 | Williams et al. |
| 6,417,762 B1 | 7/2002 | Comer |
| 6,449,318 B1 | 9/2002 | Rumbaugh |
| 6,452,482 B1 | 9/2002 | Cern |
| 6,477,212 B1 | 11/2002 | Bingel et al. |
| 6,492,897 B1 | 12/2002 | Mowery |
| 6,496,104 B2 | 12/2002 | Kline |
| 6,507,573 B1 | 1/2003 | Brandt et al. |
| 6,515,485 B1 | 2/2003 | Bullock et al. |
| 6,522,626 B1 | 2/2003 | Greenwood |
| 6,549,120 B1 | 4/2003 | de Buda |
| 6,590,493 B1 | 7/2003 | Rasimas et al. |
| 6,646,447 B2 | 11/2003 | Cern et al. |
| 6,781,481 B2 | 8/2004 | Richardson |
| 6,784,790 B1 * | 8/2004 | Lester ................. H02J 13/0034 340/12.35 |
| 2001/0045888 A1 | 11/2001 | Kline |
| 2001/0052843 A1 * | 12/2001 | Wiesman ................. H04B 3/56 340/538.16 |
| 2001/0054953 A1 | 12/2001 | Kline |
| 2002/0002040 A1 | 1/2002 | Kline et al. |
| 2002/0010870 A1 | 1/2002 | Gardner |
| 2002/0024423 A1 | 2/2002 | Kline |
| 2002/0027496 A1 | 3/2002 | Cern et al. |
| 2002/0048368 A1 | 4/2002 | Gardner |
| 2002/0049368 A1 | 4/2002 | Ritland |
| 2002/0075797 A1 | 6/2002 | Kilani |
| 2002/0095662 A1 | 7/2002 | Ashlock et al. |
| 2002/0097953 A1 | 7/2002 | Kline |
| 2002/0098867 A1 | 7/2002 | Meiksin et al. |
| 2002/0098868 A1 | 7/2002 | Meiksin et al. |
| 2002/0105413 A1 | 8/2002 | Cern et al. |
| 2002/0109585 A1 | 8/2002 | Sanderson |
| 2002/0110310 A1 | 8/2002 | Kline |
| 2002/0110311 A1 | 8/2002 | Kline |
| 2002/0118101 A1 | 8/2002 | Kline |
| 2002/0121963 A1 | 9/2002 | Kline |
| 2002/0141523 A1 | 10/2002 | Litwin, Jr. et al. |
| 2002/0154000 A1 | 10/2002 | Kline |
| 2003/0007576 A1 | 1/2003 | Alavi et al. |
| 2003/0016123 A1 * | 1/2003 | Tager ................... H04B 3/54 375/261 |
| 2003/0052771 A1 | 3/2003 | Enders et al. |
| 2003/0070026 A1 | 4/2003 | Sides et al. |
| 2003/0156014 A1 | 8/2003 | Kodama et al. |
| 2003/0160684 A1 | 8/2003 | Cern |
| 2003/0190110 A1 | 10/2003 | Kline |
| 2003/0201759 A1 | 10/2003 | Cern |
| 2003/0201873 A1 | 10/2003 | Cern |
| 2003/0210135 A1 | 11/2003 | Cern |
| 2003/0222747 A1 | 12/2003 | Perkinson et al. |
| 2003/0222748 A1 | 12/2003 | Cern et al. |
| 2003/0224784 A1 | 12/2003 | Hunt et al. |
| 2004/0032320 A1 | 2/2004 | Lalitzky et al. |
| 2004/0056734 A1 | 3/2004 | Davidow |

* cited by examiner

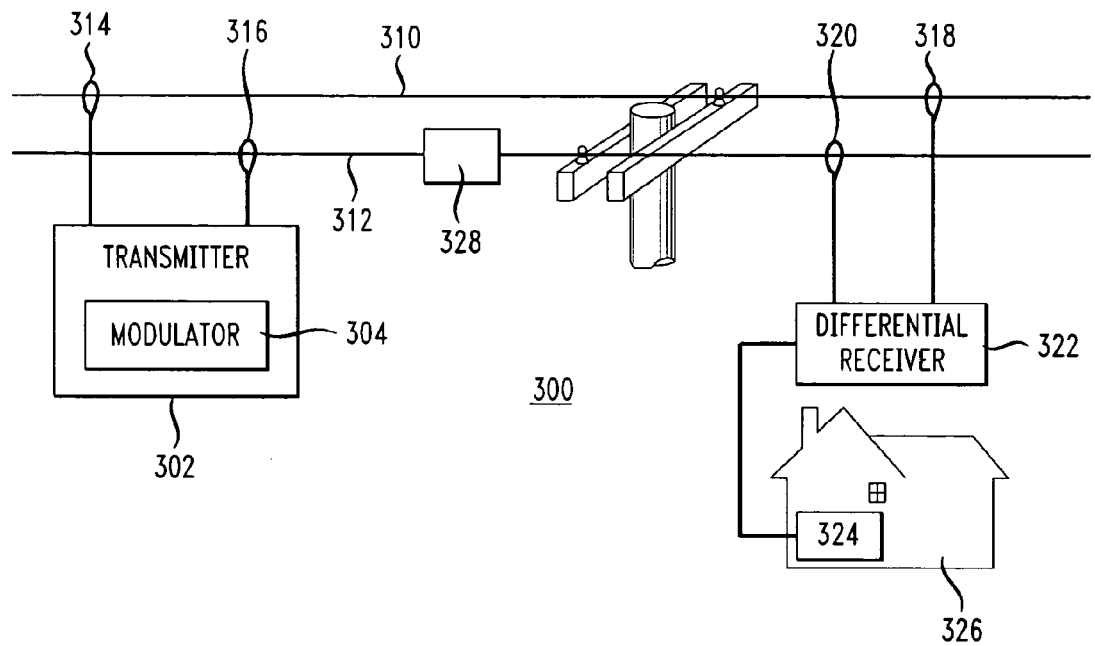
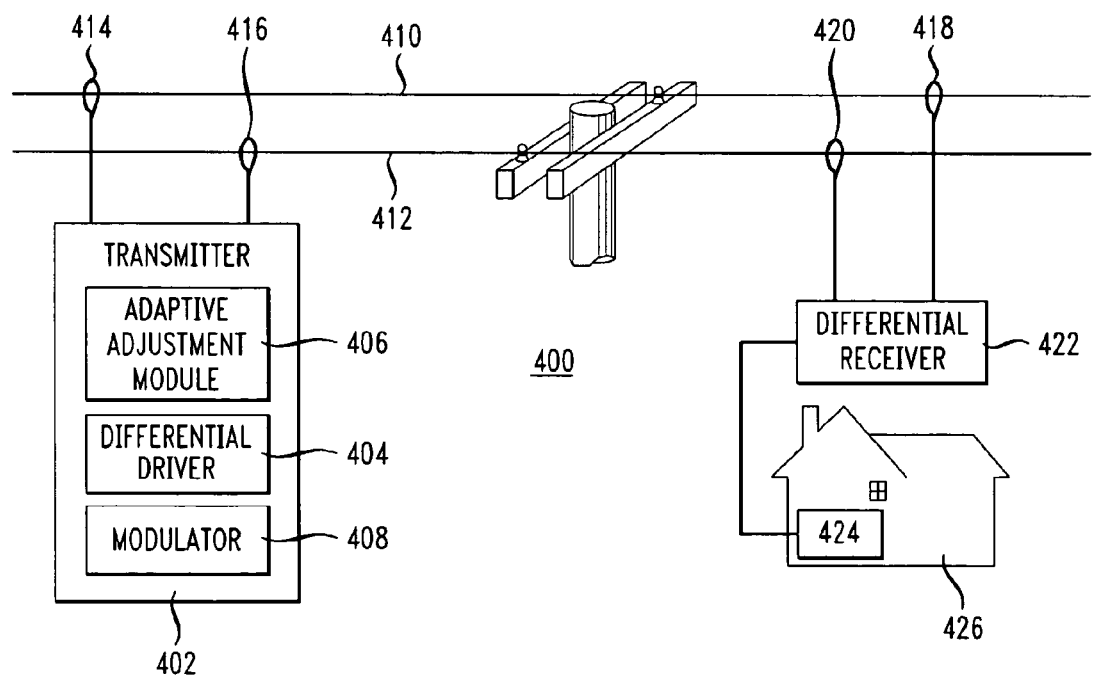

OUTBOUND INTERFERENCE REDUCTION IN A BROADBAND POWERLINE SYSTEM

CROSS REFERENCE TO RELATED APPLICATIONS

This application is a continuation of U.S. patent application Ser. No. 14/551,582, filed Nov. 24, 2014 and issued on Feb. 21, 2017 as U.S. Pat. No. 9,577,706, which is a continuation of U.S. patent application Ser. No. 10/839,945, filed May 6, 2004 and issued on Jan. 20, 2015 as U.S. Pat. No. 8,938,021, and is related to commonly assigned patent application Ser. No. 10/840,096 filed on May 6, 2004 and issued on Aug. 15, 2006 as U.S. Pat. No. 7,091,849, entitled Inbound Interference Reduction in a Broadband Powerline System, all of which are incorporated herein by reference.

BACKGROUND OF THE INVENTION

This application relates generally to data transmission, and more particularly to data transmission over power lines.

The use of power lines to transmit data is known. Initially, powerline communication systems were limited to relatively low data rates, typically less than 500 kbs. These low data rates are generally useful for applications such as remote control of various switches connected to the powerline system. More recently, developments have been made in the area of broadband powerline communication systems, also known as powerline telecommunications (PLT) systems or broadband powerline (BPL) systems. These systems are capable of transmitting data at significantly higher data rates than previous systems. For example, BPL systems can transmit data at rates of 4-20 Mbps.

While existing powerline systems are capable of transmitting data at the rates described above, they were not initially designed for data transmission. Instead, they were designed to carry large currents at high voltages so that significant amounts of energy could be distributed at one primary low frequency (e.g., 60 Hertz).

Powerline communication systems generally use one or more carrier frequencies in order to spread the data transmission over a wider range of frequencies. The low data rate powerline communication systems discussed above generally utilized frequencies in the range of 9kHz to 525 kHz. In this frequency range the risk of emissions is low as the attenuation of the cable is low and the wavelengths used in the signaling are long with respect to the typical cable lengths in the system. However, the high data rates of BPL systems cannot be achieved using carrier frequencies below 525 kHz. Instead, BPL systems typically use carrier frequencies in the range of 1-30 MHz. At these higher frequencies the powerline cables become more effective radiators of electromagnetic waves.

One of the problems with a BPL system is the risk of interference to radio communications services caused by the generation of electromagnetic emissions from the powerlines over which the BPL system operates. The physical attributes of the powerlines (e.g., high elevation and unshielded wiring) along with the higher carrier signal frequencies needed for high bandwidth data transmission, contribute to this interference problem.

BRIEF SUMMARY OF THE INVENTION

I have recognized that a power line acts as an antenna and may be modeled using antenna analysis techniques. Further, I have recognized that the key to reducing interference effects of a BPL system is to reduce the gain of the power lines which are acting as an antenna. One advantageous technique for reducing gain is to use a balanced transmission line, which may be achieved by using two wires and differential excitation. While the general properties of balanced transmission lines is known in the art, the prior art has not appreciated the benefit of balanced transmission lines for reducing radiated interference in powerline communication systems. I have realized that such unwanted interference can be reduced, or eliminated, by exploiting the properties of a balanced (or approximately balanced) transmission line.

In accordance with one embodiment of the invention, data is transmitted via modulated first and second carrier signals on respective first and second lines of the powerline system. At least one characteristic of at least one of the first and second carrier signals is adjusted in order to improve the electrical balance of the lines of the powerline system. The adjusted characteristic may be, for example, carrier signal phase or carrier signal amplitude.

In accordance with another embodiment of the invention, the powerline communication system is a frequency division multiplexed system transmitting data on a plurality of frequency channels and the carrier signal characteristics are adjusted independently for each of the frequency channels.

The adjustments of the carrier signal characteristics may be performed in response to known imbalances in the powerline transmission system, or may be performed in response to a dynamic determination of an imbalance in the powerline transmission system.

In accordance with another embodiment of the invention, the characteristics of the transmission lines may be altered using a line balancing element in order to improve the electrical balance of the transmission lines. For example, the line balancing element may be a wrap-around magnetically permeable core which impedes the transmission of RF signals.

These and other advantages of the invention will be apparent to those of ordinary skill in the art by reference to the following detailed description and the accompanying drawings.

BRIEF DESCRIPTION OF THE DRAWINGS

FIG. 3 shows another embodiment of the invention utilizing a line balancing element; and FIG. 4 shows another embodiment of the invention utilizing adaptive methods.

DETAILED DESCRIPTION

Figure 1:
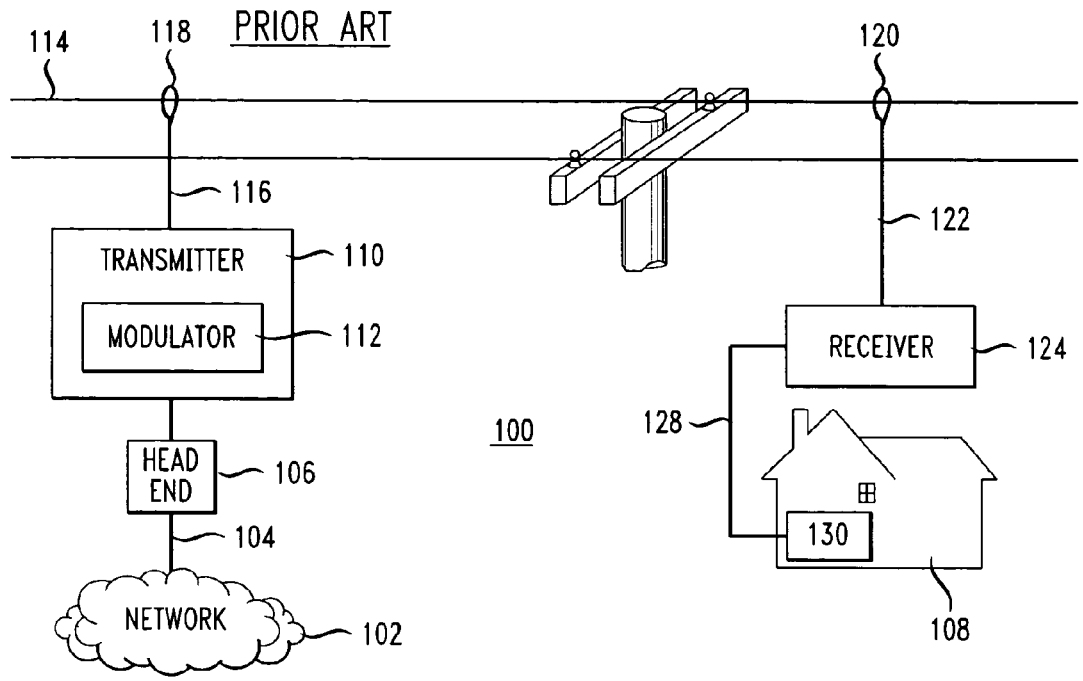
FIG. 1 shows a typical prior art powerline communication system.

A typical prior art powerline communication system 100 is shown in FIG. 1. A head end network node 106 is connected to a data network 102 via a fiber optic cable 104. In accordance with a typical network service, the head end 106 is configured to transmit data to end user premises (e.g., premises 108) using powerline cables as the transmission medium. The head end 106 is also configured to convert signals in the optical domain received from fiber 104 to the electrical domain using well known optical to electrical conversion techniques. The head end 106 is connected to a transmitter 110. The transmitter 110 contains a modulator 112 which modulates the data received from head end 106 onto a carrier signal using well known RF modulation techniques. As described above, typical carrier frequencies for a powerline communication system are in the range of 1-30 MHz. The modulated signal is provided to the powerline cable 114 via line 116 and coupler 118. A powerline communication system 100 of the type shown in FIG. 1 may use orthogonal frequency division multiplexing (OFDM) in which the available bandwidth is split up into multiple narrowband channels which do not interfere with each other. Thus, in accordance with OFDM transmission, multiple carrier signals, each having its own frequency band and representing a distinct data channel, are carried over the cable 114.

For purposes of the present description, it is assumed that the powerline cable 114 is a medium voltage (MV) powerline cable typically supplying power at 4-66 kV. Such medium voltage cable is typically an aluminum cable having a 1 cm diameter. Coupler 118 couples the modulated carrier signal supplied by line 116 to the MV line 114. Various types of couplers 118 are known in the art. For example, coupler 118 may be an inductive coupler, a capacitive coupler, or may employ direct metallic contact. The carrier signal is transmitted along the length of MV powerline cable 114 to coupler 120 which couples the signal from the MV powerline cable 114 to a receiver 124 via line 122.

The signal from receiver 124 is provided to the premises 108 via low voltage (LV) powerline 128. The low voltage powerline typically supply power at 100-240 volts. Thus, one of the functions of the receiver is to translate the data from the MV line to the LV line. The low voltage line is connected to a modem 130 within the premises 108. The modem 130 demodulates the signal received from the MV powerline cable 114 and extracts the data that was transmitted from the head end 106. It is noted that in particular embodiments, it is possible that the receiver 124 further functions to demodulate the data and deliver it to a second transmitter (not shown) that would re-modulate the data and send it to the premises 108.

It is noted that for ease of description only downstream (i.e., from head end to end user) data transmission is shown and described. One skilled in the art would readily recognize that upstream transmission could be accomplished in a similar manner.

As described above in the background section, one of the significant problems with powerline data transmission systems as shown in FIG. 1 is the effect of interference from the powerline transmission lines. As described above, there is the risk of interference to radio communications services caused by the generation of electromagnetic emissions from the powerlines over which the system operates.

I have recognized that a MV powerline acts as an antenna and may be modeled using antenna analysis techniques. Using the assumptions described above, and depending upon the effective terminating impedance presented by the couplers, the MV line may be considered to be dipole antenna (approximately several wavelengths long) or a traveling-wave (Beverage) antenna. In either case, the power line's ohmic resistance is less than 2 ohms, and so dissipation is negligible. The powerline wire radiates approximately half the power launched in each direction and makes the remaining half available at the termination points. For either the dipole or the traveling-wave antenna, the effective gain G of the wire is approximately 0-10 dB, depending upon the wavelength.

If P is the power launched onto the wire, then the Effective Isotropic Radiated Power (EIRP) is defined as $$EIRP \approx \left(\frac{P}{2}\right)G$$

In the United States, Part 15 of the Federal Communications Commission Rules, (47 CFR 15) sets forth the regulations under which an intentional, unintentional, or incidental radiator may be operated without an individual license. Under these rules, the upper limit on allowable launched power is give by:

$$\frac{EIRP}{4\pi r^2} < \frac{E\max^2}{Zfs}$$

where r=30 m, Emax=30 uV/m in 9 KHz and Zfs=377 ohms. For G=10, this puts an upper limit on launched power of Pmax=−52 dBm in a 9 KHz channel. See, e.g., 47 CFR 15.109, 15.209.

The lower limit on launched power is set by the interference environment. Assume, for example, that we want to protect against incoming interference with a margin of 10 dB. For strong interference, e.g., received level of S9 or −73 dBm, desired signal power at the receiver must be greater than −73 dBm+10 dB or −63 dBm, so the launched power must be greater than −60 dBm. (Since only about half of the launched power is available at the receiver). Thus, the launched power (in a 9 KHz slot) is bounded by:

−60 dBm<launched power<−52 dBm.

The above described model defines the basic constraint on the signal power levels in a BPL system. For reasonable system parameters, there is an operating window, within which it is possible to simultaneously satisfy the FCC requirements and also provide some margin against outside interference.

I have recognized that the key to reducing interference effects of a BPL system is to reduce the gain G of the power lines which are acting as an antenna. Such a reduction in gain G has several benefits. For example, if G is reduced by 10 dB, then the signal power required at the receiver to maintain margin against a given outside interferer is reduced by a like amount, and thus the radiated interference is reduced by 20 dB.

As a result of the above recognized model, I have also realized that one advantageous technique for reducing G is to use a balanced transmission line, which may be achieved by using two wires and differential excitation. Balanced data transmission is well known in the art of data transmission, and generally requires at least two conductors per signal. The transmitted signal is referenced by the difference of potential between the lines, not with respect to ground. Thus, differential data transmission reduces the effects of noise, which is seen as common mode voltage (i.e., seen on both lines), not differential, and is rejected by differential receivers. In the simplest type of differential data transmission system, the same signal is transmitted via both transmission lines, with the phase of the signals being offset from each other by 180 degrees. More sophisticated differential systems allow for the adjustment of the relative phase and amplitude of the two transmitted signals.

For an ideal balanced line, G=0 and there is no interference. For two parallel wires separated by a non-infinitesimal distance d, the field strength at a distance r is reduced by approximately d/r compared with the single-wire case. Thus for d=1 m and r=30 m, G is reduced by approximately 30 dB.

While the general properties of balanced transmission lines are known in the art, the prior art has not appreciated the benefit of balanced transmission lines for reducing radiated interference in powerline communication systems. I have realized that such unwanted interference can be reduced, or eliminated, by exploiting the properties of a balanced (or approximately balanced) transmission line.

Figure 2:
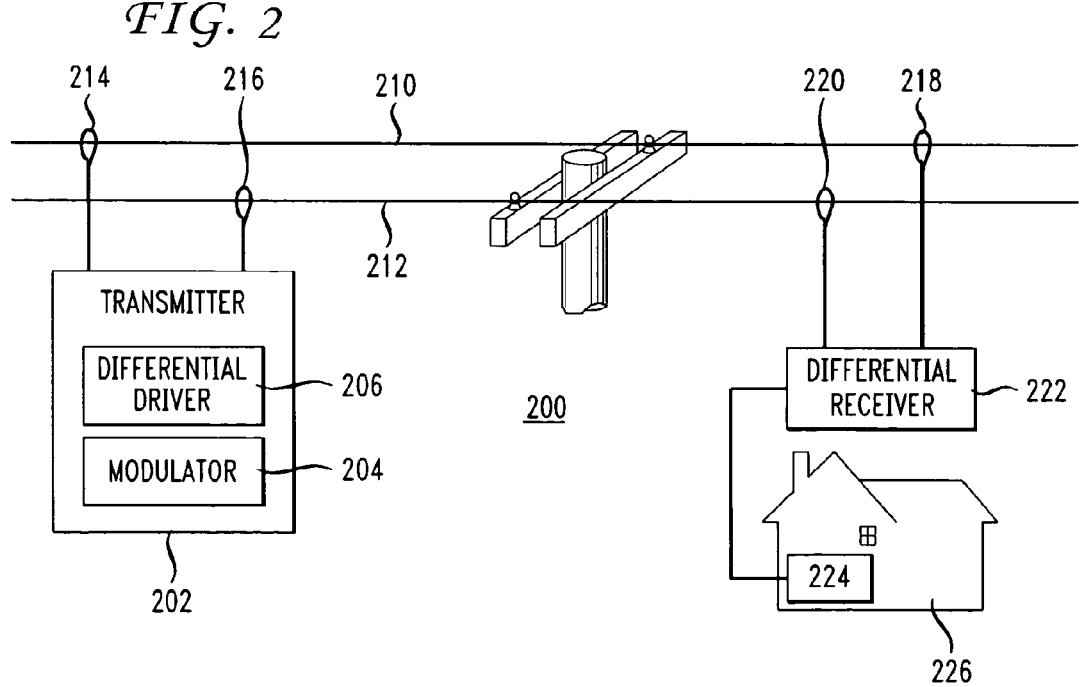
FIG. 2 shows an embodiment of the invention.

A first embodiment of the present invention is shown in FIG. 2. FIG. 2 shows a powerline communication system 200 comprising a transmitter 202 coupled to a first powerline cable 210 and a second powerline cable 212 via couplers 214 and 216 respectively. As described in conjunction with transmitter 110 of FIG. 1, transmitter 202 encodes data received from a network node (e.g., a head end 106 as shown in FIG. 1) for transmission via the power lines. The transmitter 202 contains a modulator 204 for modulating a carrier signal with the data to be transmitted using well known modulation techniques. The embodiment shown in FIG. 2 uses differential data transmission whereby a first carrier signal is modulated and coupled to power line 210 via coupler 214 and a second carrier signal is modulated and coupled to power line 212 via coupler 216. The signals are received via couplers 218 and 220 which are connected to a differential receiver 222. Differential receiver 222 responds to the difference between the signals receive via coupler 218 and 220, and transmits the difference signal to a modem 224 within the premises 226. The modem 224 demodulates the signal received from the MV power lines to extract the transmitted data.

In accordance with known differential data transmission techniques, both carrier signals have the same frequency and are modulated with the same data, but the carrier signals are transmitted having different phases. In accordance with known differential data transmission techniques, the carrier signals would be out of phase with each other by 180 degrees. However, such carrier phase signal characteristics (i.e., precise opposite phase) would only minimize interference if the two power lines 210 and 212 were fully physically symmetrical. However, in actual use, power lines are rarely fully physically symmetrical, and therefore the benefits of using differential data transmission are not fully realized with respect to reducing unwanted radiated interference.

In accordance with one embodiment of the invention, a differential driver 206 is used in connection with transmitter 202. The differential driver 206 is configured to adjust the characteristics of the carrier signal. This particular embodiment is useful, for example, if there is a known imbalance in the transmission lines. By having information about imbalance, the differential driver 206 may be configured to compensate for the known imbalance by adjusting various characteristics of the carrier signals. For example, the differential driver 206 may adjust the phases of the carrier signals so that they are not precisely 180 degrees out of phase. Alternatively, the differential driver 206 may be configured to adjust the amplitude of the signals. The main idea is that the differential driver 206 adjusts one or more characteristics of the carrier signals in order to compensate for known imbalances in the transmission lines. In this way, when data is transmitted using differential data transmission, the overall transmission system is rendered balanced. As such, there is reduced unwanted radiated electromagnetic interference.

The embodiment shown in FIG. 2 is particularly advantageous when OFDM data transmission is utilized, because each frequency channel may be individually adjusted in order to better balance the system as a whole. In such an embodiment, the differential driver adjusts signal characteristics of each narrowband carrier signal individually, because the imbalances in the transmission lines may affect different frequency channels in the OFDM system differently.

FIG. 3 shows another embodiment of the invention. FIG. 3 shows a powerline communication system 300 comprising a transmitter 302 coupled to a first powerline cable 310 and a second powerline cable 312 via couplers 314 and 316 respectively. As described in conjunction with transmitter 110 of FIG. 1, transmitter 302 encodes data received from a network node (e.g., a head end 106 as shown in FIG. 1) for transmission via the power lines. The transmitter 302 contains a modulator 304 for modulating a carrier signal with the data to be transmitted as described above. The embodiment shown in FIG. 3 also uses differential data transmission as described above. The signals are received via couplers 318 and 320 which are connected to differential receiver 322. The differenced signal is then provided to modem 324 within the premises 326. The modem 324 demodulates the signal received from the MV power lines to extract the transmitted data.

In contrast to the embodiment shown in FIG. 2, the known imbalances in the transmission lines are compensated for using a line balancing element 328 connected to one or more of the power lines. The line balancing element 328 alters the characteristics of the power line to which it is connected in order to improve the electrical balance of the powerline system. For example, the line balancing element may be a passive element that clips onto the MV line and provides an impedance (optionally tuned) to compensate for an unbalanced discontinuity on one side of the transmission line. In one embodiment, the element may be a radiator to null out unwanted radiation from the discontinuity. In another embodiment, the line balancing element may be a wrap-around magnetically permeable (e.g., iron or ferrite) core which impedes the transmission of RF signals. In yet another embodiment, the line balancing element is a stub antenna whose radiation phase and magnitude is adjusted to suppress unwanted radiation from the unbalanced system. An example of this technique is the case where one of the MV lines has a transformer attached to it, and the other MV line does not, which can result in a large imbalance. A wrap-around iron (or ferrite) core may be placed on the lead to the transformer where it taps onto the MV line such that RF currents will not be able to flow off of the MV line and into the transformer. That is, the RF currents will not see the transformer so that the MV lines appear to be balanced.

Although FIG. 3 shows a line balancing element 328 on one of the transmission lines 312, in various embodiments additional line balancing elements may be used on transmission line 312 and transmission line 310 in order to balance the system.

FIG. 4 shows another embodiment of the invention in which adaptive methods are used to balance the system. The embodiments of FIGS. 2 and 3 assumed that the imbalances in the system were known, and therefore the differential driver of FIG. 2, or the line balancing element(s) 328 of FIG. 3, could be configured in advance to compensate for the known imbalances. The embodiment of FIG. 4 provides a technique for balancing a system where the imbalances may not be known in advance. FIG. 4 shows a powerline communication system 400 comprising a transmitter 402 coupled to a first powerline cable 410 and a second powerline cable 412 via capacitive couplers 414 and 416 respectively. As described in conjunction with transmitter 110 of FIG. 1, transmitter 402 encodes data received from a network node (e.g., a head end 106 as shown in FIG. 1) for transmission via the power lines. The transmitter 402 contains a modulator 408 for modulating a carrier signal with the data to be transmitted as described above. Similar to the embodiment shown in FIG. 2, the embodiment of FIG. 4 also contains a differential driver 404. The signals are received via capacitive couplers 418 and 420 which are connected to a differential receiver 422. The decoded signal is then provided to modem 424 within the premises 426. The modem 424 demodulates the signal received from the MV power lines to extract the transmitted data.

Unlike the embodiment of FIG. 2, the differential driver 404 is not configured in advance to adjust the properties of the carrier signal(s) in a predetermined manner. Instead the differential driver is dynamically configurable to adjust the characteristics of the carrier signal(s) as necessary to compensate for discovered imbalances in the powerline transmission system.

The transmitter 402 of FIG. 4 also contains an adaptive adjustment module 406 for controlling the adjustment properties of the differential driver 404. The adaptive adjustment module sends signals to the differential driver 404 indicating the signal characteristic adjustments that need to be made in order to balance the transmission system. In one embodiment, the adaptive adjustment module builds a numerical model of the antenna properties of the power lines, and adjusts the differential driver appropriately.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

The invention claimed is:

1. A method for reducing interference radiated by a powerline transmission system, the method comprising:
    transmitting first data via a modulated first carrier signal on a first line of the powerline transmission system;
    transmitting second data via a modulated second carrier signal on a second line of the powerline transmission system; and
    adjusting a characteristic of at least one of the modulated first carrier signal or the modulated second carrier signal based on a known imbalance between the first line and the second line to improve an electrical balance of the first line and the second line of the powerline transmission system, wherein the known imbalance is a predetermined characteristic of the first and second lines.

2. The method of claim 1, wherein adjusting a characteristic of at least one of the modulated first carrier signal or the modulated second carrier signal based on the known imbalance between the first line and the second line to improve the electrical balance of the first line and the second line of the powerline transmission system comprises:
    adjusting a carrier signal phase of at least one of the modulated first carrier signal or the modulated second carrier signal based on the known imbalance between the first line and the second line to improve the electrical balance between the first and second lines of the powerline transmission system.

3. The method of claim 1, wherein adjusting a characteristic of at least one of the modulated first carrier signal or the modulated second carrier signal based on the known imbalance between the first line and the second line to improve the electrical balance of the first line and the second line of the powerline transmission system comprises:
    adjusting a carrier signal magnitude of at least one of the modulated first carrier signal or the modulated second carrier signal based on the known imbalance between the first line and the second line to improve the electrical balance between the first and second lines of the powerline transmission system.

4. The method of claim 1, wherein the powerline transmission system is a frequency division multiplexed system transmitting data on a plurality of frequency channels.

5. The method of claim 4, wherein adjusting is performed independently for each of the frequency channels.

6. The method of claim 5, wherein adjusting a characteristic of at least one of the modulated first carrier signal or the modulated second carrier signal based on the known imbalance between the first line and the second line to improve the electrical balance of the first line and the second line of the powerline transmission system comprises:
    adjusting a phase independently for each of the frequency channels in the at least one of the modulated first carrier signal or the modulated second carrier signal.

7. The method of claim 5, wherein adjusting a characteristic of at least one of the modulated first carrier signal or the modulated second carrier signal based on the known imbalance between the first line and the second line to improve the electrical balance of the first line and the second line of the powerline transmission system comprises:
    adjusting an amplitude independently for each of the frequency channels in the at least one of the modulated first carrier signal or the modulated second carrier signal.

8. A transmitter for use in a powerline communication system having a first transmission line and a second transmission line, the transmitter comprising:
    at least one modulator for modulating first data onto a first carrier signal and for modulating second data onto a second carrier signal; and
    a differential driver connected to the at least one modulator for adjusting a characteristic of at least one of the first carrier signal or the second carrier signal to improve an electrical balance of the powerline communication system based on a known imbalance between the first transmission line and the second transmission line, wherein the known imbalance is a predetermined characteristic of the first and second transmission lines.

9. The transmitter of claim 8, wherein the differential driver adjusts a carrier signal phase of at least one of the first carrier signal or the second carrier signal based on the known imbalance between the first transmission line and the second transmission line.

10. The transmitter of claim 8, wherein the differential driver adjusts a carrier signal phase of at least one of the first carrier signal or the second carrier signal based on the known imbalance between the first transmission line and the second transmission line.

11. The transmitter of claim 8, wherein the powerline communication system is a frequency division multiplexed system transmitting data on a plurality of frequency channels.

12. The transmitter of claim 11, wherein the differential driver performs the adjusting independently for each of the frequency channels.

13. The transmitter of claim 12, wherein the differential driver adjusts a phase independently for each of the frequency channels in the at least one of the first carrier signal or the second carrier signal.

14. The transmitter of claim 12, wherein the differential driver adjusts
an amplitude independently for each of the frequency channels in the at least one of the first carrier signal or the second carrier signal.

15. A method for reducing interference radiated by a powerline transmission system comprising:
transmitting first and second data via respective modulated first and second carrier signals on respective first and second transmission lines of the powerline transmission system using differential excitation; and
generating the modulated first and second carrier signals having characteristics which compensate for a known imbalance between first and second transmission lines of the powerline transmission system, wherein the known imbalance is a predetermined characteristic of the first and second transmission lines.

16. The method of claim 15, wherein generating the modulated first and second carrier signals having characteristics which compensate for the known imbalance between the first and second transmission lines of the powerline transmission system, wherein the known imbalance is a predetermined characteristic of the first and second transmission lines comprises:
generating the modulated first and second carrier signals having carrier signal phases which compensate for the known imbalance between the first and second transmission lines of the powerline transmission system.

17. The method of claim 15, wherein generating the modulated first and second carrier signals having characteristics which compensate for the known imbalance between first and second transmission lines of the powerline transmission system, wherein the known imbalance is a predetermined characteristic of the first and second transmission lines comprises:
generating the modulated first and second carrier signals having carrier signal magnitudes which compensate for the known imbalance between the first and second transmission lines of the powerline transmission system.

18. The method of claim 15, wherein the powerline transmission system is a frequency division multiplexed system transmitting data on a plurality of frequency channels.

19. The method of claim 18, wherein generating the modulated first and second carrier signals having characteristics which compensate for the known imbalance between the first and second transmission lines of the powerline transmission system comprises:
generating the modulated first and second carrier signals in which phases are adjusted independently for each of the frequency channels in the modulated first and second carrier signals to compensate for the known imbalance between the first and second transmission lines of the powerline transmission system.

20. The method of claim 18, wherein generating the modulated first and second carrier signals having characteristics which compensate for the known imbalance between the first and second transmission lines of the powerline transmission system comprises:
generating the modulated first and second carrier signals in which amplitudes are adjusted independently for each of the frequency channels in the modulated first and second carrier signals to compensate for the known imbalance between the first and second transmission lines of the powerline transmission system.

* * * * *